Patented Aug. 11, 1936

2,050,287

UNITED STATES PATENT OFFICE 2,050,287

PROCESS OF PRODUCING LOWER ALIPHATIC ACID ANHYDRIDES

Henry Dreyfus, London, England

No Drawing. Application October 19, 1932, Serial No. 638,527. In Great Britain November 3, 1931

19 Claims. (Cl. 260—123)

This invention relates especially to the manufacture of acetic anhydride or other aliphatic anhydrides.

According to the present invention aliphatic anhydrides are produced by subjecting to thermal decomposition aliphatic acid esters of glycols or other polyhydroxy alcohols which have not more than one alcoholic hydroxyl group attached to an individual carbon atom. The present invention is more particularly concerned with the thermal decomposition of aliphatic acid diesters of ethylene glycol, for instance the thermal decomposition of ethylene glycol diacetate to produce acetic anhydride, ethylene glycol dipropionate to produce propionic anhydride, ethylene glycol acetate butyrate to produce acetic butyric anhydride, but includes also the thermal decomposition of other bodies. Thus for the production of acetic anhydride 1,2 propylene glycol diacetate and 1,2 diacetine may be subjected to thermal decomposition.

Besides aliphatic anhydrides the thermal decomposition produces ethers, for example in the case of ethylene glycol diesters ethylene oxide is formed, but it is to be noted that under the conditions employed for effecting the thermal decomposition the ethers may become decomposed and it is to be understood that the invention is not limited to processes in which an ether is obtained as a product as well as an aliphatic anhydride.

The thermal decomposition may be effected over a wide range of temperatures but whilst relatively high temperatures such as 600 to 1000° C. may be employed without substantial decomposition of the anhydride formed preferably lower temperatures e. g. 450–600° C. are employed, whilst lower temperatures e. g. 200–400° C. may be employed if desired and are usually advantageous when it is desired to obtain both anhydride and ether as products.

The decomposition may be effected under any desired pressure but it is usually advantageous to employ pressures not substantially exceeding atmospheric pressure or even to employ sub-atmospheric pressures.

Very satisfactory yields of anhydride may be obtained when the ester is decomposed in the absence of substances exerting a catalytic effect on the reaction. However in some cases catalysts may with advantage be employed; thus for instance the ester may be heated in the presence of a metallic salt, and especially an alkali metal salt, of the fatty acid whose anhydride is to be produced. For example, when glycol diacetate is decomposed to give acetic anhydride, a catalyst comprising sodium acetate may be used. As examples of other bodies which may be employed to assist the decomposition may be mentioned zinc halides, sulphuric acid, phosphoric acids, surface catalysts such as for instance as pumice, silica gel or kieselguhr and catalysts which promote the scission of aliphatic acids into their anhydrides and water. When such catalysts are employed, it is advantageous to perform the decomposition at moderate or low temperatures, for instance temperatures not substantially exceeding 350° C.

Conveniently the decomposition may be effected by passing the vapors of the esters in a stream through tubes or other forms of apparatus heated to the desired temperatures. Advantageously the tubes or other forms of apparatus may contain catalysts such as those above mentioned. The tubes or other forms of apparatus may be made of or lined with any suitable material such, for instance, as copper, fused silica, chrome-nickel steels and earthenware and whether or not they contain catalysts may be filled with balls of wire or cellular structures of copper or other metal of high thermal conductivity to enable efficient and uniform heating of the esters to be attained. Dilution of the vapors with indifferent gases such, for instance, as nitrogen, carbon dioxide and the like is often helpful in suppressing decomposition of the anhydride to gaseous products.

The decomposition may be effected by passing the vapors of the esters through baths of liquid or molten materials heated to the desired temperatures, such liquid or molten materials may or may not consist of or contain catalysts such, for instance, as molten zinc chloride or other molten salts or mixtures of salts, especially such as are capable of promoting thermal decomposition of aliphatic acids into their anhydrides and water.

Instead of passing the vapors of the esters through the heated tubes or through the heated liquid or molten substances the esters may be sprayed or injected in liquid form in the tubes or zones containing or not containing catalysts, contact or filling materials. Alternatively the esters may be dropped on to heated surfaces, catalysts or substances.

When the esters are subjected to the decomposition in vapor form the ester vapor may be preheated for instance by passage through heated tubes which preferably contain filling materials of high thermal conductivity, e. g. copper wire or turnings, or for instance by passage through heated baths of liquid or molten material unaffected by and having no deleterious effect upon the ester vapor. If desired such preheating may be wholly or partly effected by heat exchange with the vapors coming from the decomposition zone or vessel.

Whilst the above described methods of effecting the decomposition of the esters are of great value particularly when the decomposition is to be performed in a continuous manner other methods may be employed.

Thus for instance the esters may be heated in admixture with catalysts of the dehydrating or etherifying type such as zinc chloride, phosphoric acid, sulphuric acid or even in the absence of such substances. Temperatures of about 200–300° C. or more are very suitable, particularly when catalysts are employed, for such a method of operation which is very convenient when it is desired to effect the decomposition as a discontinuous or batch process.

It is of course not necessary that the ester used as the starting material should be employed in the pure state. Thus glycol diacetate, for example, may be made in any convenient way and at once subjected to thermal decomposition, without any stringent separation of other substances present either as by-products or as unaltered starting materials from the manufacture thereof. When glycol diacetate is made from acetic acid, it is apparent that the invention represents a very simple and efficient means of converting acetic acid, either pure or in aqueous solution, into acetic anhydride, or as an alternative, of concentrating a dilute acetic acid solution.

Thus in one application of the invention, acetic acid may be caused to react with ethylene oxide, and the resulting glycol diacetate thermally decomposed to give acetic anhydride. In preparing glycol diacetate in this way, it is advantageous to employ the acetic acid in amount at least equal to and preferably greater than that theoretically required.

Thus acetic acid may be heated with the ethylene oxide, preferably under pressure, for example under 5–20 atmospheres or more, to a temperature of about 70°–120° C. or higher. If desired a condensing agent such as, for instance, zinc chloride or aluminium chloride, may be present. Any ethylene oxide and/or acetic acid remaining after the reaction may be removed in any convenient way, for example by distillation, and the glycol diacetate remaining may, if desired after separation of any condensing agent present, for instance by distillation of the ester, or by filtration or centrifuging or in any other convenient way, be subjected to thermal decomposition.

Furthermore, it is not necessary to employ glacial acetic acid in this process; comparatively dilute aqueous solutions may also be used. In such cases it is preferable to concentrate the glycol diacetate before subjecting it to thermal decomposition. This concentration may be performed in any convenient way, for example by distillation with or without azeotropic liquids, or by separating the water from the ester by decantation, centrifuging etc. The glycol diacetate so obtained may then be subjected, without further treatment to thermal decomposition.

Although acetic acid of low concentration may be caused to react with ethylene oxide to give glycol diacetate, I prefer to employ moderate or high concentrations of, for example, 60% or over. The use of dehydrating or condensing agents is especially valuable when considerable quantities of water are present.

It is not necessary that the glycol diacetate or other ester should be employed in an absolutely dry state, although preferably not more than small quantities of water should be present. In cases when water is present it may be advisable to separate the anhydride produced from the water vapor before allowing the latter to condense. This may be done in any convenient way, as described, for example, in U. S. Patent No. 1,817,614 and U. S. applications Nos. 285,613 filed 15th June, 1928, 284,566 filed 11th June, 1928, 330,577 filed 5th January, 1929 and 514,903 filed 10th February, 1931. Thus, for example, the water may be separated by fractionally condensing the mixture; or the mixed vapors may be treated with a solvent for the anhydride that is immiscible with water, under such conditions that the anhydride is dissolved, either in the liquid or vapor phase, while the water vapor remains uncondensed and/or undissolved, or again the water may be removed by means of an entraining liquid therefor at a temperature below the boiling point of the anhydride, or any other convenient method may be employed.

Ethylene oxide or other ether produced together with the anhydride in the thermal decomposition of glycol diacetate may be separated from the anhydride and other vapors in any convenient way. For example in the case of ethylene oxide and other ethers of high volatility, it may be recovered after condensation of anhydride and, if such is present, water vapor. Ethylene oxide may be caused to react with fresh acetic acid to regenerate glycol diacetate and thus acetic acid may be continuously converted into acetic anhydride without substantial consumption of ethylene oxide, thus providing a cheap and simple method of effecting this conversion.

The invention may also be employed for the concentration of dilute acetic acid or other aliphatic acids. As stated above, although solutions of very low concentration may be employed directly, it is usually preferable to employ other means to concentrate very dilute solutions up to about 50–70%. Solutions of such moderate or high concentrations may however be converted directly into glycol diacetate in the case of acetic acid, and this compound subjected, after concentration, to thermal decomposition. If the glycol diacetate still contains a certain amount of water, this may be allowed to combine with the acetic anhydride formed, and more water may be added if necessary, preferably after decomposition, in quantity sufficient to produce an acid of the concentration required.

The following examples illustrate the production of acetic anhydride by the process of the invention but it is to be understood that these examples are in no way limitative.

*Example 1*

Ethylene diacetate is vaporized and the vapor is passed in a rapid stream through a copper tube containing pieces of iron-free pumice coated with phosphoric acid and heated to a temperature of about 400° C.

The products of the reaction are condensed and subjected to fractional distillation to obtain the acetic anhydride produced in as pure a form as possible.

*Example 2*

Ethylene diacetate is vaporized and the vapor is fed to a number of jets in a bath of molten zinc chloride maintained at a temperature of about 380° C. The vapors leaving the surface of the zinc chloride are condensed and fractionated to separate the acetic anhydride produced.

What I claim and desire to secure by Letters Patent is:—

1. Process of producing lower aliphatic acid anhydrides, which comprises thermally decomposing lower aliphatic acid diesters of lower aliphatic polyhydroxy alcohols, which polyhydroxy alcohols are liquid at normal temperatures and have not more than one oxygen atom attached to any individual carbon atom.

2. Process of producing lower aliphatic anhydrides which comprises thermally decomposing lower aliphatic acid diesters of glycols.

3. Process of producing lower aliphatic anhydrides which comprises thermally decomposing lower aliphatic acid diesters of ethylene glycol.

4. Process of producing acetic anhydride, which comprises thermally decomposing diacetates of lower aliphatic polyhydroxy alcohols, which polyhydroxy alcohols are liquid at normal temperatures and have not more than one oxygen atom attached to any individual carbon atom.

5. Process of producing acetic anhydride which comprises thermally decomposing ethylene glycol diacetate.

6. Process of producing lower aliphatic acid anhydrides and ethers, which comprises thermally decomposing lower aliphatic acid diesters of lower aliphatic polyhydroxy alcohols, which polyhydroxy alcohols are liquid at normal temperatures and have not more than one oxygen atom attached to any individual carbon atom.

7. Process of producing acetic anhydride and ethylene oxide which comprises thermally decomposing ethylene glycol diacetate.

8. Process of producing lower aliphatic acid anhydrides, which comprises thermally decomposing, at temperatures between 200° and 1000° C., lower aliphatic acid diesters of lower aliphatic polyhydroxy alcohols, which polyhydroxy alcohols are liquid at normal temperatures and have not more than one oxygen atom attached to any individual carbon atom.

9. Process of producing lower aliphatic acid anhydrides, which comprises thermally decomposing, at temperatures between 450° and 600° C., lower aliphatic acid diesters of lower aliphatic polyhydroxy alcohols, which polyhydroxy alcohols are liquid at normal temperatures and have not more than one oxygen atom attached to any individual carbon atom.

10. Process of producing lower aliphatic anhydrides which comprises thermally decomposing, at temperatures between 450 and 600° C., lower aliphatic acid diesters of ethylene glycol.

11. Process of producing acetic anhydride which comprises thermally decomposing, at temperatures between 450 and 600° C., ethylene glycol diacetate.

12. Process of producing lower aliphatic acid anhydrides, which comprises thermally decomposing, at temperatures between 200° and 450° C., lower aliphatic acid diesters of lower aliphatic polyhydroxy alcohols, which polyhydroxy alcohols are liquid at normal temperatures and have not more than one oxygen atom attached to any individual carbon atom.

13. Process of producing lower aliphatic acid anhydrides and ethers, which comprises thermally decomposing, at temperatures between 200° and 450° C., lower aliphatic acid diesters of lower aliphatic polyhydroxy alcohols, which polyhydroxy alcohols are liquid at normal temperatures and have not more than one oxygen atom attached to any individual carbon atom.

14. Process of producing acetic anhydride and ethylene oxide which comprises thermally decomposing, at temperatures between 200 and 450° C., ethylene glycol diacetate.

15. Process of producing lower aliphatic acid anhydrides, which comprises thermally decomposing lower aliphatic acid diesters of lower aliphatic polyhydroxy alcohols, which polyhydroxy alcohols are liquid at normal temperatures and have not more than one oxygen atom attached to any individual carbon atom, in the presence of an acid reacting compound selected from the group consisting of zinc chloride, sulphuric acid and phosphoric acid.

16. Process of producing lower aliphatic acid anhydrides, which comprises thermally decomposing lower aliphatic acid diesters of lower aliphatic polyhydroxy alcohols, which polyhydroxy alcohols are liquid at normal temperatures and have not more than one oxygen atom attached to any individual carbon atom, in the presence of an alkali metal acetate.

17. Process of producing lower aliphatic acid anhydrides, which comprises thermally decomposing lower aliphatic acid diesters of lower aliphatic polyhydroxy alcohols, which polyhydroxy alcohols are liquid at normal temperatures and have not more than one oxygen atom attached to any individual carbon atom, in the presence of a catalyst which promotes the scission of aliphatic acids into their anhydrides and water.

18. Process of producing lower aliphatic acid anhydrides, which comprises thermally decomposing, at temperatures between 200° and 600° C., lower aliphatic acid diesters of lower aliphatic polyhydroxy alcohols, which polyhydroxy alcohols are liquid at normal temperatures and have not more than one oxygen atom attached to any individual carbon atom, in the presence of an acid reacting compound selected from the group consisting of zinc chloride, sulphuric acid and phosphoric acid.

19. Process of producing acetic anhydride which comprises thermally decomposing, at temperatures between 200 and 600° C., ethylene glycol diacetate in the presence of an acid reacting compound selected from the group consisting of zinc chloride, sulphuric acid and phosphoric acid.

HENRY DREYFUS.